March 2, 1954

C. P. DUFFY 2,670,968

COLLAPSIBLE TRUCK STEP

Filed Aug. 29, 1951

Cyrus P. Duffy
INVENTOR.

BY *Clarence A. O'Brien*
*and Harvey B. Jacobson*
Attorneys

March 2, 1954    C. P. DUFFY    2,670,968
COLLAPSIBLE TRUCK STEP
Filed Aug. 29, 1951    3 Sheets-Sheet 2
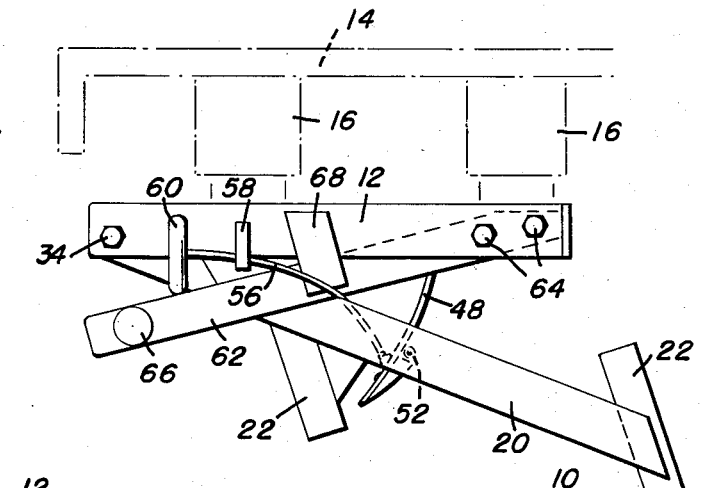
Fig. 3.
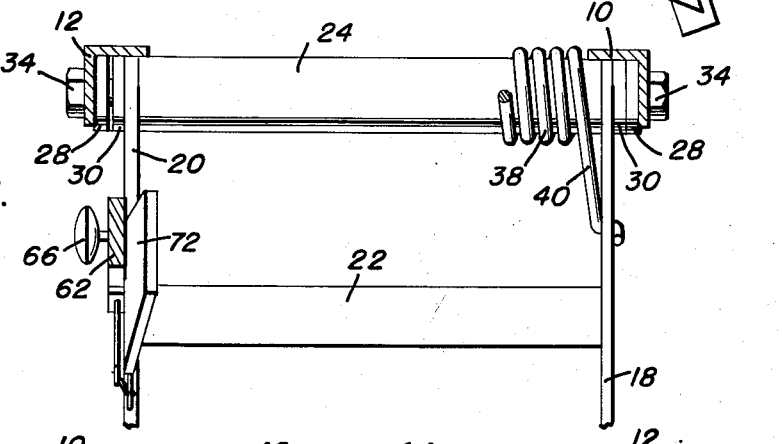
Fig. 4.
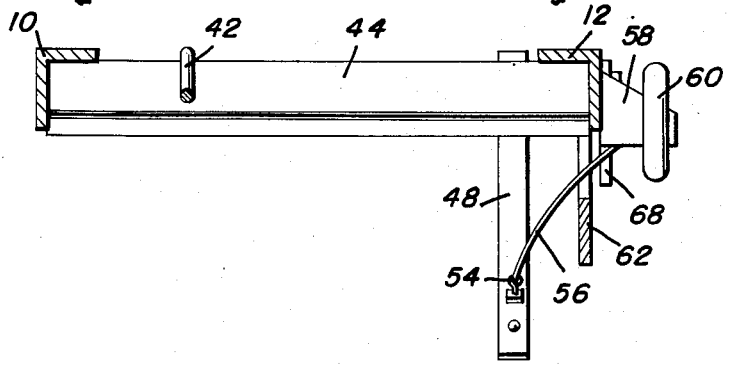
Fig. 5.
Fig. 6.
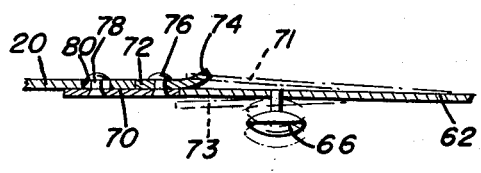
Cyrus P. Duffy
INVENTOR.
BY *Clarence A. O'Brien*
and *Harvey B. Jacobson*
Attorneys March 2, 1954  C. P. DUFFY  2,670,968
COLLAPSIBLE TRUCK STEP Filed Aug. 29, 1951  3 Sheets-Sheet 3

Cyrus P. Duffy
INVENTOR.

BY *Clarence A. O'Brien*
*and Harvey B. Jackson*
Attorneys

Patented Mar. 2, 1954

2,670,968

UNITED STATES PATENT OFFICE 2,670,968

COLLAPSIBLE TRUCK STEP

Cyrus P. Duffy, Brooklyn, N. Y.

Application August 29, 1951, Serial No. 244,141

13 Claims. (Cl. 280—167)

This invention comprises novel and useful improvements in a collapsible truck step and more specifically pertains to a foldable step assembly adapted for attachment to conventional trucks and which is provided with overload release means to permit folding or yielding of the step assembly as when the truck backs into an obstacle.

The primary object of this invention is to provide an improved foldable step assembly for trucks which shall be extremely sturdy, have relatively few parts subjected to wear, and shall incorporate in its folding mechanism safety features to prevent damage to the step or truck when the latter is backed into an obstacle with the step in its extended position.

An important object of this invention is to provide a collapsible step assembly for trucks and the like which shall be secured to the frame of the truck with a minimum number of pivots and wherein the pivotal connection shall be of an exceedingly sturdy construction.

Yet another object of the invention is to provide a truck assembly in conformity with the foregoing objects which shall have resilient means yieldingly urging the step assembly into its collapsed position.

Yet another object of the invention is to provide a collapsible truck assembly as set forth in the foregoing objects in which an improved latch means shall be provided to positively retain the assembly in its extended position; and yet which will permit disengagement of the latching means upon the imposition of an overload upon the step assembly as when backing the truck against an obstacle.

An additional important object of the invention is to provide a collapsible truck step assembly in accordance with the foregoing objects in which the assembly shall be positively retained in its collapsed position and yet may be readily released therefrom when it is desired to move the assembly into its extended position.

These, together with various ancillary features and objects of the invention, which will later become apparent as the following description proceeds, are attained by the present invention, preferred embodiments of which have been illustrated, by way of example only, in the accompanying drawings, wherein:

Figure 3 is a view similar to Figure 2 but showing the assembly in its collapsed position, the latch means for retaining the assembly in the collapsed position being shown therein;

Figure 4 is a vertical transverse sectional view taken substantially upon the plane indicated by the section line 4—4 of Figure 2;

Figure 5 is a vertical transverse sectional view taken substantially upon the plane indicated by the section line 5—5 of Figure 2;

Figure 6 is a detail view taken substantially upon the plane indicated by the section line 6—6 of Figure 2, the latched position of a latching means being shown in full lines therein, and alternative positions of the latching means being shown in dotted lines therein;

Figure 1:
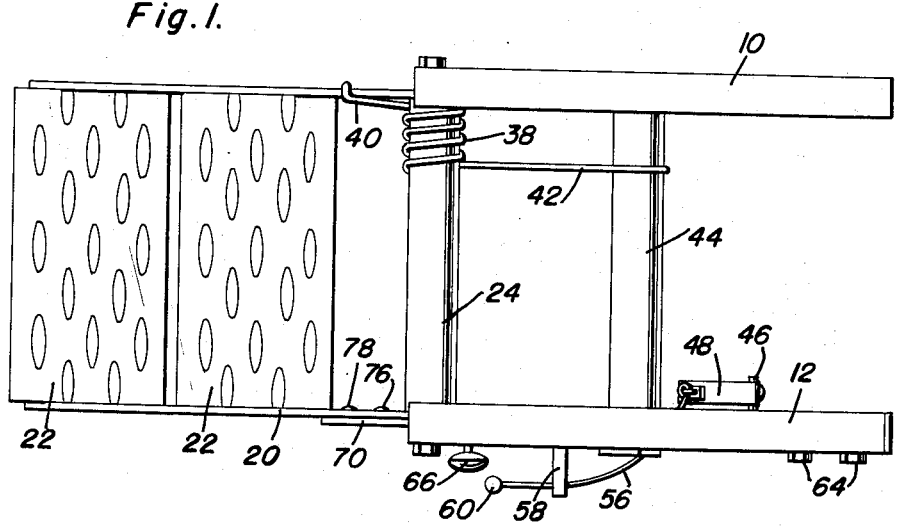
Figure 1 is a top plan view of a portion of a truck frame showing the preferred embodiment of a truck step assembly incorporating therein the principles of this invention applied thereto, the assembly being shown in its extended position ready for use.

For a more comprehensive understanding of the principles of this invention and illustrative manners in which these principles may be effectively applied, attention is directed more specifically to the accompanying drawings, wherein like numerals designate similar parts throughout the various views. In the various embodiments illustrated, the collapsible step assembly is disclosed as an attachment which may be readily applied to conventional trucks with a minimum expenditure of labor and time, to provide a sturdy and dependable step assembly. In all of these modifications, it is possible to employ resilient means for yieldingly urging the assembly towards its closed position by the arrangement in Figures 1–7, or into its collapsed position as in Figures 8–11. In each of the embodiments, an overload release means is built into and forms a part of the latching mechanism to provide a safety feature whereby damage is prevented to the step assembly, or the frame of the truck in the event that an overload is placed upon the step assembly as for example by the driver of the truck backing the same against an obstacle with the assembly inadvertently left in its extended position. In addition, in the form of Figures 1–7, mechanism is provided for positively securing the step assembly in its folded position except when services of the assembly are required.

Referring now more specifically to the embodiment of Figures 1–7, which is considered to be the preferred embodiment of the principles of this invention, it will be seen that the step assembly is pivotally connected to a pair of side frame members 10 and 12 with which a truck is customarily provided. Usually these frame members are of channel or angle iron construction, as will be more readily apparent from Figures 4 and 5, and the bed of a truck body indicated generally by the numeral 14 is mounted upon these frame members as by transverse bolsters or the like 16.

The step assembly forming the subject of this invention includes a pair of side rails 18 and 20 having a pair of step treads 22 secured thereto in any desired manner. These treads may conveniently comprise sheet metal members of any desired type, the principles of this invention not being limited to any particular construction of the same.

Figure 7:
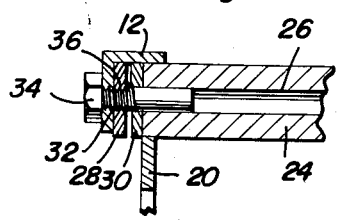
Figure 7 is a vertical transverse sectional detail view taken substantially upon the plane indicated by the section line 7—7 of Figure 2 and showing the pivot means whereby the step assembly is secured to the frame of a truck.

At their upper ends, side rails 18 and 20 are welded or otherwise rigidly secured and attached to a transverse member 24 at the ends of the latter, as shown clearly in Figures 4 and 7. Conveniently, the transverse member 24 may be of tubular construction, and is provided with an axial bore 26 which may extend entirely through the member, or may be formed only in the ends thereof to provide journal bearings for the pivot means by which the step assembly is secured to the truck frame.

Pairs of washers or similar members 28 and 30 are respectively welded to the adjacent surfaces of the frame members 10 and 12 and the side rails 18 and 20 to provide wear surfaces for the rubbing action of the pivot bearings.

As shown more clearly in the detail view of Figure 7, shafts 32 are provided which extend through aligned apertures in the frame members 10 and 12, the washers 28 and 30, and into the bores 26. These shafts may conveniently include a shouldered end portion 34 by means of which the same may be applied or removed, and may have a screw threaded engagement, such as shown at 36, with the apertures in the side frame members 10 and 12 and in the reinforcing washers 28 welded thereto; or conversely, may have a turning fit in 10, 12 and 28 and a tight screw threaded fit in 24 and 30.

Figure 2:
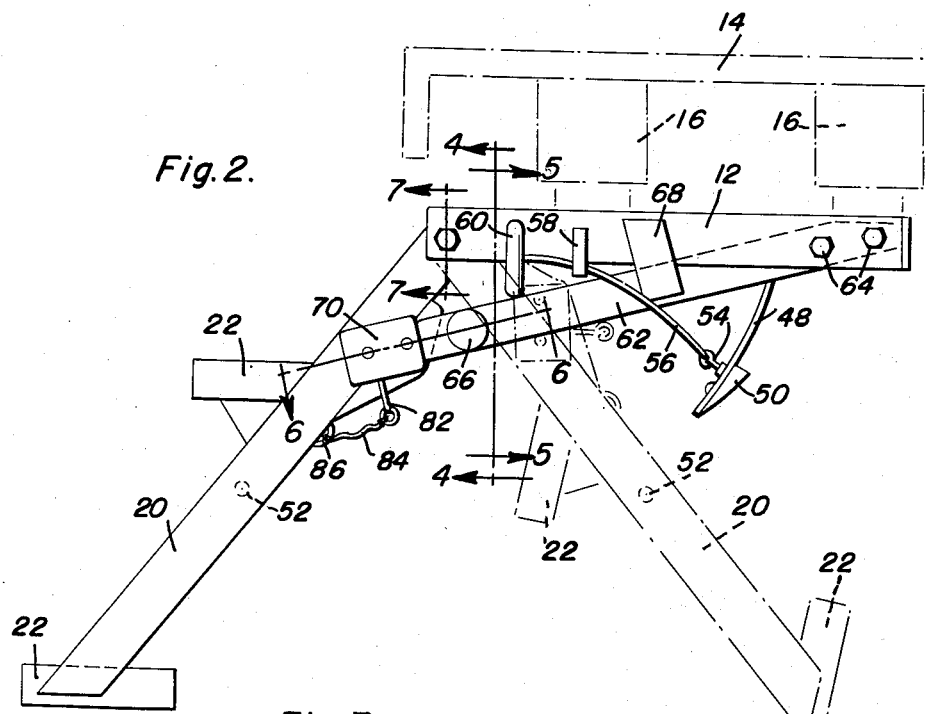
Figure 2 is a side elevational view of the construction and embodiment of Figure 1, the assembly being shown in its extended position in full lines, and in an intermediate position between the extended and collapsed positions in dotted lines therein.

It will thus be seen that the collapsible truck step assembly is pivotally secured by the shafts 32 to the two frame members 10 and 12 and has a vertical swinging movement beneath these frame members as will be seen from Figures 2 and 3. It is preferred to locate the shafts comprising pivot pins adjacent the rear ends of the frame members 10 and 12, in order to render the action of the step assembly most efficient.

Resilient means is provided for yieldingly urging the step assembly into its closed or collapsed position. This resilient means may conveniently comprise a helical torsion spring 38 which is coiled about and mounted upon the transverse member 24, and has oppositely extending arms 40 and 42 which respectively engage one of the step side rails as 18, and a horizontal transverse frame member 44 which may be applied to the truck frame or may form a conventional part thereof. It is contemplated that the strength of the coil spring 38 will be sufficient to normally urge the step to an intermediate position as shown in dotted lines in Figure 2. The function of this spring is to partially move the step from its extended position shown in full lines in Figure 2 to a partially retracted position shown in dotted lines therein, beneath the body of the truck and out of the way.

A latch means is provided for retaining the step assembly in its collapsed position. As shown in Figure 1, one of the frame members is provided with a laterally extending support pin 46, and a resilient leaf spring 48 is secured thereto and extends downwardly therefrom. Upon its lower end, the spring 48 has fixedly secured a wedge-shaped block 50 which comprises a latching dog. The latter is intended to hook or engage and be resiliently pressed against a transverse latch pin 52 which extends between the side rails 18 and 20 of the step assembly. Thus, when the step is pushed manually from the intermediate position shown in dotted lines in Figure 2 to the fully retracted position shown in Figure 3, the wedge-shaped surface of the dog 50 will slide over the pin 52 until the dog clears the same, at which time inherent resiliency of the leaf spring 48 will cause the shouldered end of the dog to press firmly and securely against the latch pin, thereby retaining the step in its folded or fully collapsed position.

A manual release means is provided for disengaging the latching dog to permit the weight of the step to cause the same to pivot downwardly from the closed position of Figure 3 to the intermediate position of Figure 2, the resistance of the spring 38 being relatively weak and insufficient to prevent such downward movement during this portion of the pivoting of the step. This release means may conveniently comprise an eye bolt 54 secured to the dog 50 together with a flexible cable or cord 56. The latter extends laterally outwardly from beneath the frame member 12, extends through a guide bracket 58 welded or otherwise attached to the side of the frame member 12, and is provided with a handle or knob portion 60 whereby the driver may manually release the latching means.

A further latch means is provided for securing the leg assembly in its extended position. This last mentioned latching means preferably consists of a leaf spring 62 which is bolted to the truck frame member 12 as by bolts 64 and which adjacent its outer end is provided with a knob 66. The leaf spring member 62 is thus mounted for lateral swinging movement with respect to the side of the frame member 12. A bracket 68 is welded to the side of the frame member and constitutes the stop which limits outward movement of the latch spring 62 relative to the frame.

The latching means further includes an abutment in the form of a plate 70 which is mounted upon the side rail 20 of the step assembly and disposed in substantial alignment with the longitudinal axis of the latch spring 62 when the step is in its extended position. As will be best seen from Figure 6, the abutment 70 may be in the form of a flat plate which is mounted upon the outer surface of the side rail 20 in fixed position thereon, and has its outer edge adapted to be abutted by the adjacent edge of latch spring 62.

The inherent resiliency of the latch spring 62 is such as to cause the same to normally be biased into the dotted line position shown at 71 in Figure 6, in order to insure that the latch lever will be retained in abutting engagement with the abutment 70. For this purpose a guide plate 72 is provided which is mounted upon the side rail 20 in suitable relation to abutment plate 70 as shown in Figure 6. The extremity of the plate 72 is curved as at 74 to provide a guide member whereby when the step is moved from an extreme extended position inwardly to its locking extended position, the member 74 will guide the end of the latch lever 62 from the dotted line position 71 into the full line position shown in Figure 6. The lever 62 can of course be released by grasping the knob 66 and pulling the lever in the dotted line position shown at 73, at which time the step assembly will be free to pivot downwardly by its own weight and by the action of spring 38 from the full line position of Figure 2 to the dotted line position shown therein.

The device as so far described will in many instances be found to be sufficient. However, where the truck step assembly is mounted upon the rear of a truck or positioned where the assembly is liable to be damaged if the truck is operated to cause the extended truck assembly to strike an obstacle, it is preferred to provide an overload release means which will cause disengagement of the latch member 62 from the abutment plate 70 and permit the assembly to collapse, thereby preventing damage to the assembly or to the truck frame.

Various forms of removal or release means could be provided, but that disclosed in Figure 6 is deemed to be eminently satisfactory. This means includes shear means which upon an overload being imposed upon the step assembly will shear off and thus release or break the latching engagement. As illustrated, the shear means includes a pair of shear pins 76 and 78 which may conveniently be in the form of rivets, bolts or the like.

The first of these pins 76, is utilized to connect the plate 72 to the abutment plate 70 as shown in Figure 6. It will of course be understood that the plate 72 is also welded to the side rail 20 and thus constitutes in effect an integral part of the same.

The second shear pin 78 is of greater size than the pin 76, so that a still greater force will be required to effect shearing of the second pin. In addition, the pin 78 extends through an enlarged or elongated aperture 80 formed in the side rail 20 so that no shearing torque will be imparted to the shear pin 78 until the pin 76 has been sheared and the abutment plate 70 has carried the second shear pin 78 against the edge of the elongated aperture 80.

It will thus be seen that disabling of the collapsible step assembly by the shearing of the first pin, as for example by placing too heavy a load upon the steps 22 or by overloading the step assembly in the manner previously described, is prevented. However, after the first pin 76 has been sheared, a very slight additional movement of the step assembly with respect to the latch lever 62 will be sufficient to shear the second pin thereby releasing the abutment plate 70 and permitting the step assembly to collapse.

Conveniently, an eye bolt 82, see Figure 2, may depend from the plate 70 and be attached as by a chain or cable 84 to an eye 86 carried by the side rail 20 so as to prevent loss of the abutment plate 70 after the latter has been sheared from the side rail.

The operation of this form of the invention is as follows: Assuming that the step assembly is in the collapsed or folded position shown in Figure 3, the same is brought into use by operating the manual release 60, 56, thereby disengaging the latch dog 50 from the latch pin 52. The weight of the step assembly, despite the very light resistance of the coil spring 38 in this position of the assembly, is now sufficient to cause the step assembly to drop downwardly from the closed position in Figure 3 to an intermediate position shown in dotted lines in Figure 2. The operator now manually moves the step assembly to the full line position of Figure 2. During this movement, the latch spring 62 moves from the dotted line position shown at 73 in Figure 6 to the position shown at 71 after the end of the guide plates 72 and 74 passes the end of the latch lever. The step assembly is now in a position somewhat to the left of that shown in full lines in Figure 2 and the torsion spring 38 has been further tensioned while moving the assembly from the dotted line position of Figure 2 to the full line position shown therein. Consequently, the operator now releases the step assembly, the spring 38 will move the step assembly in a counter-clockwise direction. During the last part of this movement, the guide member 74 will engage the latch member 62 in the dotted line position 71 thereof, and guide and seat this latch lever against the abutting surface of the abutment plate 70, as shown in full lines in Figure 6. The step assembly is now ready for use, being thus securely latched or locked in its extended position.

If an undue load is placed upon the step assembly, the pin 76 will shear whereby the abutment plate 70 will move towards the left of Figure 6 until the pin 78 engages the left hand end of the slot or elongated hole 80. If the overload is still applied to the step assembly, as when the operator has inadvertently left the step assembly extended and backs the truck against an obstacle, the second pin 78 will shear. At this time, the abutment plate 70 will drop downwardly away from the side rail 20 to which the same was fixedly secured, although the plate will not be lost by virtue of the retaining cable 84. With the release of the abutment plate 70, the side rail 20 and consequently the step assembly is now free to pivot in the counter-clockwise direction under the impetus of spring 38 and its own weight and to the dotted line position shown in Figure 2. In this position, the step is retracted and out of the way, and may be pushed to the full line position shown in Figure 3. When this step is manually pushed into this position, either the shear pins have been broken by an overload, or by manual disengagement on the latching member 62 by the knob 66 when the operator desires to dispense with the services of the step, the latch pin 52 will slide up the inclined surface of the latch dog 50 until the latter engages over the latch pin and thus locks the assembly in its closed position as shown in Figure 3.

Figure 12:
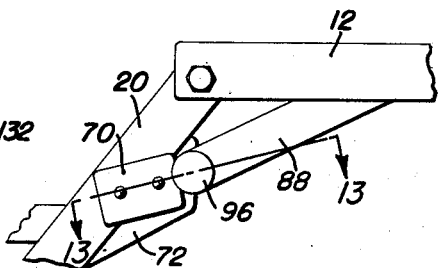
Figure 12 is a fragmentary side elevational view of a modified form of latching means which may be employed with the construction of Figures 1–7.
Figure 13:
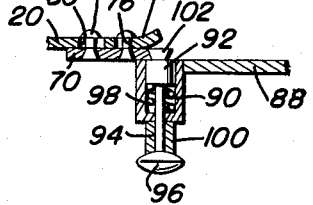
Figure 13 is a horizontal sectional detail view taken substantially upon the plane indicated by the section line 13—13 of Figure 12, the latching means being shown in its latched position.

Attention is directed to the modified construction of Figures 12 and 13 which may be utilized in place of the latch lever 62. In this form of the invention, the latch lever 88 is provided which is identical with the lever 62 except that the lever 88 is of a rigid rather than a resilient nature and at its outer end is provided with a boss or cylinder 90 in which is slidably received a plunger 92 having a stem 94 with a knob 96. The plunger is slidable in the cylinder 90, the stem 94 extending through the closed end of the same, a compression spring 98 being mounted in the cylinder between the plunger and the end of the cylinder as shown in Figure 13. A sleeve or collar 100 surrounds the stem 94 and is disposed between the knob 96 and cylinder 90 to limit the inward movement of the plunger. Extending axially from the end of the plunger is a conical collar or shoulder 102 which under the bias of the spring 98 is intended to be placed in alignment with the edge of the abutment plate 70 as shown in Figure 13. The abutment edge on the plate 70 is provided with a beveled surface corresponding to the inclination of the conical projection 102. The operation of this latching means will be readily apparent. When the locking plunger is retracted against the force of the spring 98, the conical member 102 will be retracted into the cylinder 90 whereby the side rail 20 and the abutment plate 70 thereon will pass by the latching member and the step may be moved into its closed position. However, once the latch is engaged as shown in Figure 13, the engaging inclined surfaces of the members 102 and 70 will prevent lateral displacement of the member 88 and thus insure the maintenance of the latch engagement.

The overload release means in the form of the shear pins is provided for the abutment plate 70 in the same manner as described in connection with Figures 1-7.

Figure 14:
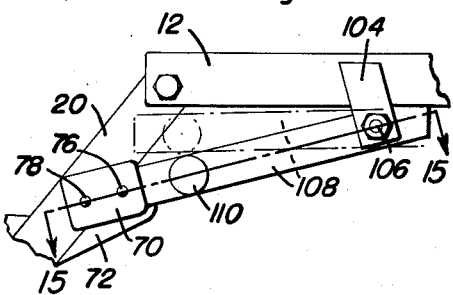
Figure 14 is a fragmentary side elevational view of a still further form of latch means which may be employed with the embodiment of Figures 1–7; and, Figure 15 is a fragmentary detail view taken substantially upon the plane indicated by the horizontal section line 15—15 of Figure 14, the latch means being shown in its latched position therein.
Figure 15:
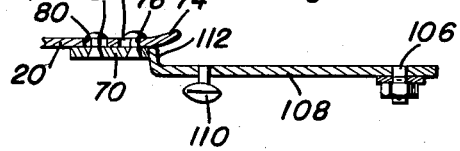

In another form of the invention latching means may be provided as disclosed in Figures 14 and 15. In this modification, a bracket 104 is welded or otherwise attached to the side of the frame member 12, and pivoted to this bracket by a pivot pin 106, is a latching lever 108. This lever is provided with a knob 110, and is provided with an inwardly or laterally disposed flange 112 constituting the locking surface which is engageable with the abutment plate 70. The latter is of the construction above mentioned, and is provided with overload release means also mentioned hereinbefore. In operation, the latch member 108 may be pivoted upwardly as shown in dotted lines in Figure 14 until the same is out of engagement with the abutment plate 70, whereupon the step assembly can be moved into its folded or closed position. When the step is extended, the latching member is pivoted downwardly to the full line position shown in Figure 14, whereupon the flanging portion 112 is disposed in abutting engagement with the abutment plate 70. Further downward movement of the latch 108 from its latching position may be prevented by causing abutting engagement of the rearward end of the latch lever 108 with the undersurface of the frame member 12 as shown in Figure 14.

Reference is now made to Figures 8-11 for a still further embodiment in accordance with this invention. In this form, the step assembly including the side rails, one of which is shown at 20, is pivoted to the frame members, one of which is shown at 12, by the shafts 32 as previously described. However, a modified form of resilient means and overload release and latching mechanism is provided, while the latch for retaining the step assembly in its closed position may be either omitted or utilized in the same manner as set forth in connection with Figures 1-7 as desired.

Depending from and fixedly secured to the transverse member 24, which is pivotally secured to the side rails of the step assembly, is a mounting bracket 116. This bracket may be welded or otherwise rigidly attached to the transverse member 24 and of course has a pivotal or oscillating movement therewith as the step assembly extended or closed. A leaf spring assembly 118 is secured to the bracket 116 as by the fastening bolt 120. Welded to the side rail 20 are spaced upper and lower plates 122 and 124. The outer ends of these plates are inclined inwardly of the side rails as at 126.

Figure 8:
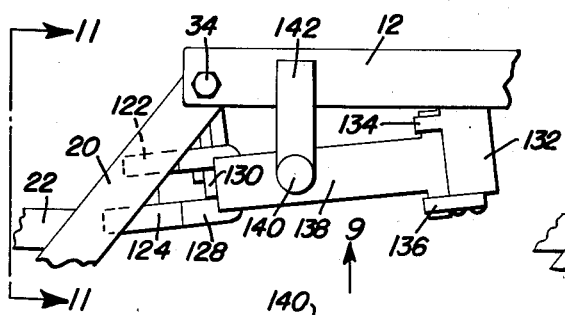
Figure 8 is a fragmentary side elevational view showing a modified form of the truck step assembly employing a different form of resilient and latching means therein.
Figure 11:
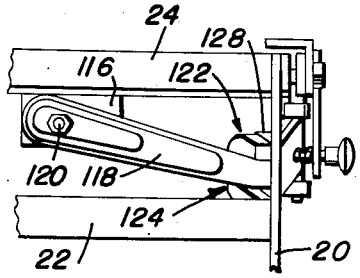
Figure 11 is an end elevational view of the embodiment of Figure 8, taken substantially upon the plane indicated by the section line 11—11 thereof.

A U-shaped guide member 128 is mounted upon the inclined portions 126 of the two plates 122 and 124, with the legs of the U-shaped member being disposed on the plates 122 and 124 upon their inclined portions 126, and with the web of the U closing the outer ends of these plates as will be apparent from Figures 8 and 11.

The extremity of the leaf spring 118 is slidably received between the plates 122 and 124 and within the legs of the U-shaped member 128 as will be apparent from Figure 11. In the extended position of the step, the end of the spring extends outwardly beyond the U-shaped member, this extending extremity constituting a resilient abutment as indicated by the numeral 130 in Figures 8 and 9. However, as the step assembly is folded inwardly from the position of Figure 8, the extremity 130 will flex until the same is retracted inwardly of the U-shaped member and/or the inclined portion 126 of the strips 122 and 124, as shown in Figure 10. In this retracted position, the extremity 130 is no longer capable of functioning as an abutment member.

A bracket 132 is bolted or is welded to the underside of the frame member 12 and depends therefrom. This bracket has an integral hinge lug 134 and a removable lug or hinge plate 136 secured thereto by bolts 137.

A latch lever 138 is hinged between the lugs 134 and 136 as shown in Figure 8 and has its other extremity disposed closely adjacent the abutment member 130 and movable towards and from this member by virtue of the hinge mounting of the lever.

A pull knob 140 is provided and is slidable through a bracket 142 welded or otherwise secured to the side of the frame member 12, this knob being secured to the lever and being surrounded by a compression spring 144 which thus urges the lever away from the bracket and towards the inclined U-member 128.

Figure 9:
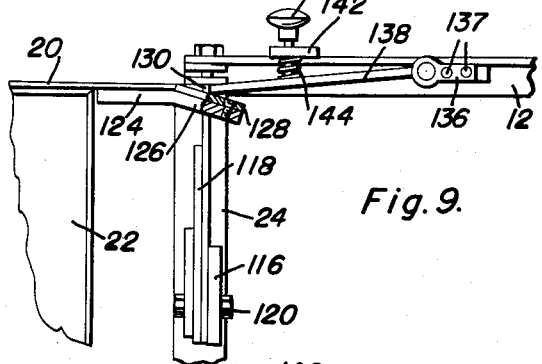
Figure 9 is a fragmentary bottom plan view of the embodiment of Figure 8, the view being taken in the direction indicated by the arrow 9 of Figure 8, the latch means for retaining the step in its extended position being indicated in its operative position.
Figure 10:
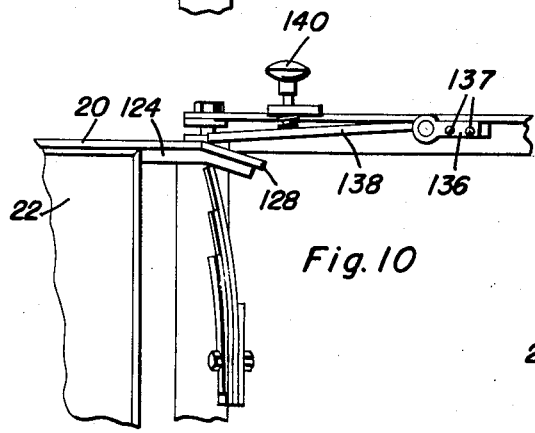
Figure 10 is a view similar to Figure 9 but showing the position of the latch means in a position for releasing the step assembly when the latter has been subjected to an overload.

The arrangement is such that in the extended position of the step assembly the end of the lever 138 will slidingly rest upon the inclined U-member 128 and will abut the end of the abutment member 130 as shown in Figure 9. However, if an overload is placed upon the step assembly, the latter will pivot in a counter-clockwise direction as viewed in Figure 8 thereby pressing the spring 118 and its abutment surface 130 against the latch. Since the spring will yield, the end of the latch will slide up the inclined surface 128, compressing or deflecting the spring until the end 130 is completely retracted below the inclined surfaces and within the U-shaped member. At this time, as shown in Figure 10, the latch member 138 is now free of the abutment, whereupon the entire step assembly can pivot inwardly to its release or closed position.

Obviously, the knob 140 may be manipulated to positively move the lever laterally out of engagement with the abutment member 130, when it is desired to close or fold the leg assembly.

In this form of the invention, the step assembly will collapse when subjected to an overload without the necessity for replacing shear pins or the like before the step assembly can be restored to an operative condition, as in the embodiment of Figures 1–7.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A collapsible truck step assembly comprising a step including side rails, pivot means securing said side rails to the frame of a truck for vertical swinging movement between extended and collapsed positions, resilient means urging said step towards its collapsed position, latch means for retaining said step in its collapsed position, means for releasing said latch means, means for securing said step in its extended position, means responsive to overload upon said step for releasing said securing means, said securing means including an abutment on said step and a latching lever, said latching lever having an abutment surface engageable with said abutment, said overload release means constituting shearable means securing said abutment upon said step.

2. A collapsible truck step assembly comprising a step including side rails, pivot means securing said side rails to the frame of a truck for vertical swinging movement between extended and collapsed positions, resilient means urging said step towards its collapsed position, latch means for retaining said step in its collapsed position, means for releasing said latch means, means for securing said step in its extended position, means responsive to overload upon said step for releasing said securing means, said securing means including an abutment on said step and a latching lever, said latching lever having an abutment surface engageable with said abutment, said overload release means comprising a first shear pin fixedly securing said shoulder and said step and a second shear pin connecting said shoulder to said step, said second shear pin having lost motion means preventing placing said second shear pin in shear until said first shear pin has been broken.

3. The combination of claim 2 including retaining means for loosely securing said shoulder to said step upon severing of said shear pins.

4. A collapsible truck step assembly comprising a step, pivot means securing said step to the frame of a truck for vertical swinging movement between extended and collapsed position, means for securing said step in its extended position, said securing means comprising an abutment member fastened to said step and a latch lever engageable with said abutment member, means responsive to overload upon said step for releasing said abutment member from said step.

5. A collapsible truck step assembly comprising a step, pivot means securing said step to the frame of a truck for vertical swinging movement between extended and collapsed position, means for securing said step in its extended position, said securing means comprising an abutment member fastened to said step and a latch lever engageable with said abutment member, means responsive to overload upon said step for releasing said abutment member from said step, resilient means operatively associated with said step for yieldingly urging said step into one of said positions.

6. The combination of claim 5 wherein said pivot means comprises a transverse member fixedly and rigidly secured to said step, shafts adapted for mounting upon the frame of a truck and journaling said transverse member.

7. The combination of claim 5 wherein said pivot means comprises a transverse member fixedly and rigidly secured to said step, shafts adapted for mounting upon the frame of a truck and journaling said transverse member, said resilient means being mounted upon said transverse member.

8. The combination of claim 4 wherein said overload release means includes an abutment on said step and a lever hinged to said frame and having an abutment surface engageable with said abutment, said lever being yieldingly urged towards a position for engagement with said abutment.

9. The combination of claim 4 wherein said overload release means includes an abutment on said step and a lever hinged to said frame and having an abutment surface engageable with said abutment, said lever being yieldingly urged towards a position for engagement with said abutment, shearable means securing said abutment to said step.

10. The combination of claim 9 wherein said last means comprises a pair of shear pins securing said abutment to said step, one of said pins being received in an elongated hole to provide lost motion.

11. The combination of claim 4 wherein said abutment member and said latch lever comprise flat plates having end-wise abutting engagement.

12. The combination of claim 4 wherein said abutment member and said latch lever comprise flat plates having end-wise abutting engagement, said latch lever being capable of lateral movement to and from alignment with said abutment member.

13. The combination of claim 4 wherein said abutment member and said latch lever comprise flat plates having end-wise abutting engagement, said latch lever being capable of lateral movement to and from alignment with said abutment member, guide means for directing the adjacent ends of said latch lever and abutment member into alignment and contact upon movement of said lever and member towards each other.

CYRUS P. DUFFY.

References Cited in the file of this patent

UNITED STATES PATENTS

| Number | Name | Date |
|---|---|---|
| 868,352 | Marr | Oct. 15, 1907 |
| 1,762,052 | Dodds | June 3, 1930 |
| 2,041,640 | Goss | May 19, 1936 |
| 2,575,615 | Crump | Nov. 20, 1951 |